United States Patent [19]

Hellermann et al.

[11] Patent Number: 5,008,343

[45] Date of Patent: Apr. 16, 1991

[54] PROCESS FOR THE PREPARATION OF POLYMERS BASED ON CONJUGATED DIENES AND OPTIONALLY MONOVINYLAROMATIC COMPOUNDS

[75] Inventors: Walter Hellermann, Dorsten; Christoph Herrmann, Marl; Hans-Bernd Fuchs, Marl; Karl-Heinz Nordsiek, Marl; Jurgen Wolpers, Haltern, all of Fed. Rep. of Germany

[73] Assignee: Huls Aktiengesellschaft, Marl, Fed. Rep. of Germany

[21] Appl. No.: 492,317

[22] Filed: Feb. 20, 1990

Related U.S. Application Data

[63] Continuation of Ser. No. 190,640, May 4, 1988, abandoned.

[30] Foreign Application Priority Data

Jul. 28, 1987 [DE] Fed. Rep. of Germany ....... 3724870

[51] Int. Cl.$^5$ ................... C08F 255/02; C08F 255/06; C08K 3/06; B32B 27/08
[52] U.S. Cl. .................................. 525/316; 526/181; 526/173; 526/209; 524/571; 428/515
[58] Field of Search ........................ 526/181, 173, 209

[56] References Cited

U.S. PATENT DOCUMENTS 4,530,985  7/1985  Broekhuis ........................... 526/181
4,577,002  3/1986  Broekhuis ........................... 526/181

FOREIGN PATENT DOCUMENTS 57-117508  6/1982  Japan .
57-85809   7/1982  Japan .

Primary Examiner—John C. Bleutge
Assistant Examiner—Vasu S. Jagannathan
Attorney, Agent, or Firm—Oblon, Spivak, McClelland, Maier & Neustadt

[57] ABSTRACT

A block-free polymer is prepared by anionically polymerizing at least two compounds selected from the groups consisting of butadiene, isoprene and styrene in an inert organic solvent in the presence of an organolithium compound as a catalyst and a cocatalyst of a glycol dialkyl ether:

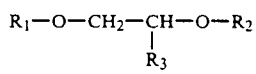

wherein $R_3$ is hydrogen, methyl or ethyl, $R_1$ and $R_2$ are alkyl groups of different numbers of carbon atoms selected from the group consisting of methyl, ethyl, n-propyl, isopropyl, n-butyl, iso-butyl, sec-butyl and t-butyl, and the total number of carbon atoms in the alkyl group ranges from 5 to 7.

14 Claims, No Drawings

PROCESS FOR THE PREPARATION OF POLYMERS BASED ON CONJUGATED DIENES AND OPTIONALLY MONOVINYLAROMATIC COMPOUNDS

This application is a continuation of application Ser. No. 07/190,640, filed May 4,1988, now abandoned.

BACKGROUND OF THE INVENTION

1. Field of the Invention

This invention relates to a process for the preparation of optionally coupled, block-free polymers based on conjugated dienes and optionally monovinylaromatic compounds, the products of the process, and their use for producing tires and antivibration elements. The products of the process are distinguished by a high proportion of 1,2-structural units of butadiene and 1,2- and 3,4-structural units of isoprene.

2. Description of the Background

Numerous processes are known for preparing conjugated diene polymers. The processes in which the monomers are polymerized anionically in an inert solvent such as hexane, cyclohexane, or toluene especially have gained industrial importance. Organoalkali metal compounds, especially alkyllithium compounds, are used as initiators, which are usually called catalysts.

Rubbers with star-shaped structures have advantages over their homologs with linear structures (cf. European Patent Application Disclosure 0 090 365). They are obtained by converting the diene monomers into so-called "living polymers" and subsequently reacting the living polymers with couplers such as polyhalo compounds or divinylaromatic compounds.

It is known that the presence of certain polar compounds, which are also called cocatalysts, has an effect on the microstructure of the diene polymers and thus on the course of the polymerization with regard to preferential formation of 1,2- and 3,4-structural units (cf. K. H. Nordsiek, K. M. Kiepert, Kautschuk and Gummi, Kunststoffe 35, 371 (1982), and K. H. Nordsiek, Kautschuk and Gummi, Kunststoffe 39, 599 (1986).

A number of processes for preparing polymers based on conjugated dienes have been developed in the past in which various cocatalysts have been used. It has been found that the cocatalyst affects the polymerization in many ways. The following requirements must be placed on the cocatalyst:

1. It should not lead to any odor contamination. This means, for example, that tertiary amines, which have also been proposed as cocatalysts, are unsuitable for this reason. In addition, amines have an undesirable affect on the adhesion of tires to steel.

It should control the course of polymerization so that the polymers obtained have more than 70% 1,2- and 3,4-isoprene structural units and more than 60% 1,2-butadiene structural units.

3. Basically, the effect of a cocatalyst depends on the ratio of the molar quantities of cocatalyst and catalyst, where the catalyst is the organolithium compound. The control effect desired as stated in paragraph 2) above should be achievable even with a cocatalyst/catalyst molar ratio of 10:1.

4. The addition of a cocatalyst affects the yield of polymer. Cocatalysts with which yields of 90% cannot be obtained are unsuitable.

5. The cocatalyst should be largely inert to the "living polymer" present as anion during the polymerization at temperatures up to 125° C. This requirement is particularly important when the living polymers are reacted with coupling agents to form star-shaped rubbers, or with suitable electrophilic compounds, after completion of the polymerization.

6. The cocatalyst should be easy to separate from the solvent by distillation. 7. The cocatalyst should be readily available synthetically.

The only compounds known to come close to meeting the above requirements are those which contain ether groups. Aliphatic dialkyl ethers such as diethyl ether and cyclic ethers such as tetrahydrofuran (THF), when employed as cocatalysts, do not exert adequate control on the microstructure of the polymer (cf. T. A. Antkowiak et al., J. of Polymer Science Part A-1, Vol. 10, pages 1319 to 1334 (1972)). Thus, for example, in the anionic polymerization of butadiene with butyllithium in the presence of up to even an 85-fold excess of THF, a polybutadiene is produced that contains only 49% 1,2structural units. The need to use such a large amount of cocatalyst is a significant drawback to its use in practice.

The same literature reference shows that in the polymerization of butadiene with ethylene glycol dimethyl ether as cocatalyst, a polymer can be obtained which contains 63.7% 1,2-structural units. However, this glycol ether has two substantial drawbacks. In the first place, it cannot be separated from hexane directly. In the second place, the coupling yield of this ethylene glycol dialkyl ether is 0%. It is therefore assumed that the two other representatives of this class of compounds known in the art, namely ethylene glycol diethyl ether and ethylene glycol dibutyl ether, would not meet the above requirements, either.

Besides the ethylene glycol dialkyl ethers, diethylene glycol dialkyl ethers have also been proposed as cocatalysts (for example, see European Patent Application Disclosure 0 090 365). The results obtained here are also unsatisfactory. In the case of the butadiene-isoprene copolymers disclosed by Japanese Patent Application Disclosure 82/87 406, which are obtained by copolymerization in the presence of butyllithium and diethylene glycol dimethyl ether, the conversion is unsatisfactory. When diethylene glycol dimethyl ether is used in the polymerization of butadiene and styrene, a coupling yield of 0% is obtained (cf. Example 8 of U.S. Pat. No. 4 530 985). Independent experiments with this glycol ether in the polymerization of isoprene gave a polymer yield of only 78%.

In experiments with diethylene glycol diethyl ether or ethylene glycol diethyl ether where isoprene is polymerized, improved yields of polymer are obtained; however, it has not been possible to obtain star-shaped rubbers. This is evidence that no living polymers at all were present in the reaction medium at the time of addition of the coupling agents. As stated in U.S. Pat. No. 4,530,985, patentee logically concluded that "many of the modifiers (meaning cocatalysts) that have generally been proposed in the past, such as diethylene glycol dimethyl ether, tend to terminate the polymerization reaction prematurely and/or to interfere with the coupling reaction" (cf. Column 1, lines 31 to 35).

Kminek et al. have also come to the conclusion that the "living polymers" are stable only for a short time in the presence of ethylene glycol dimethyl ether (cf. Makromol. Chemie 183, 1755 (1982).

European Patent Application Disclosure 0 128 607 discloses a process for the preparation of copolymers of an aromatic vinyl compound and a conjugated diene. The copolymer obtained has a vinyl content of at least 30 wt. %, is characterized by a particularly high proportion of aromatic vinyl compounds in the initial and terminal sections of the polymer chain, and is prepared by polymerization of monomer in the presence of a microstructure modifier of the general formula:

$$R^1-O-CH_2-CH_2-O-R^2$$

in which $R^1$ and $R^2$ are identical or different alkyl groups containing from 2 to 18, especially 2 to 6 carbon atoms. U.S. Pat. No. 4,530,985 proposes microstructure modifiers of the general formula:

$$R_1-O-CH_2-CH(R_2)-O-CR_3R_4-O-R_5$$

instead of the conventional glycol ethers. The microstructure control and the coupling yield using these cocatalysts are also unsatisfactory. Moreover, the compounds are difficult to obtain.

Unpublished German Patent Application P 37 07 434.2 discloses an anionic polymerization process in which an organolithium compound is used as the catalyst and an ethylene glycol dialkyl ether as the cocatalyst of the formula $R_1-O-CH_2-CH_2-O-R_2$, wherein $R_1$ and $R_2$ can be C(1-4) alkyl groups and the groups $R_1$ and $R_2$ can have different numbers of carbon atoms. However, this process is limited to the polymerization of isoprene. In the light of what is known in the art, no process is known for the preparation of polymers from at least two monomers selected from the group consisting of butadiene, isoprene, and styrene, in which the practical requirements mentioned here for the cocatalyst are met. A need therefore continues to exist for a method of producing a block-free conjugated diene polymer of improved characteristics, in a manner which is industrially more acceptable.

SUMMARY OF THE INVENTION

Accordingly, one object of the present invention is to provide a block free conjugated diene polymer of improved properties for use in the preparation of tires, antivibration devices and the like.

Another object of the invention is to produce block-free, conjugated diene polymers which have a glass transition temperature within the range of $-35$ to $\pm 5°$ C., especially $-30$ to $0°$ C.

Still another object of the invention is to provide a block-free, conjugated diene polymer by a method of improved processing features, where, as a result of the use of a cocatalyst, the specific requirements described above are met.

Briefly, these objects and other objects of the present invention-as hereinafter will become more readily apparent-can be attained in a process for preparing block-free conjugated diene polymers by anionically polymerizing at least two compounds selected from the group consisting of butadiene, isoprene, and styrene in an inert organic solvent in the presence of an organolithium compound as a catalyst and a cocatalyst of a glycol dialkyl ether of the formula:

$$R_1-O-CH_2-CH-O-R_2$$
$$|$$
$$R_3$$

wherein $R_3$ is hydrogen, methyl or ethyl, $R_1$ and $R_2$ are alkyl groups of different numbers of carbon atoms selected from the group consisting of methyl, ethyl, n-propyl, isopropyl, n-butyl, iso-butyl, sec-butyl and t-butyl, and the total number of carbon atoms in the alkyl groups ranges from 5 to 7.

DETAILED DESCRIPTION OF THE PREFERRED EMBODIMENTS

An inert organic solvent is used as the solvent for the reaction. Especially suitable are hydrocarbons of 5 to 12 carbon atoms such as pentane, hexane, heptane, and octane, as well as their cyclic analogs. Also suitable are aromatic solvents such as benzene, toluene, and the like. Of course, mixtures of the compounds described above can also be used.

The catalyst which is employed is an alkyllithium compound which is prepared by the reaction of lithium with the corresponding alkyl halide. The alkyl groups have from 1 to 10 carbon atoms, and individual hydrogen atoms can be substituted by phenyl groups. Especially suitable alkyllithium compounds include methyllithium, ethyllithium, pentyllithium, while butyllithium is preferred. In principle, bifunctional organolithium compounds can also be used as catalysts. However, these compounds are less readily available and are especially less desirable than their monofunctional analogs when it is desired to prepare star-shaped polyisoprene.

The quantity of catalyst employed in the reaction is governed by the molecular weight of the polymer that is to be achieved, which is usually in the range from 50,000 to 1,500,000. The empirically determined relationship:

$$[I]/[K]=[M]$$

between the molecular weight [M], the quantity of monomer in g [I], and the molar quantity of catalyst [K] is ordinarily used to determine the necessary quantity of catalyst. If the desired molecular weight is in the range from 50,000 to 400,000, 0.128 to 0.016 parts of n-butyllithium based on 100 parts of monomer is preferably employed. Larger amounts of catalyst are necessary to achieve molecular weights below 50,000. One skilled in the art is able to specify the quantities of catalyst on the basis of a few preliminary experiments. The cocatalyst is preferably added at the beginning of the reaction. However, it can also be added during the polymerization, if this should be suitable for any reason.

In the ethylene glycol ether cocatalyst of the present invention, $R_3$ is a methyl or ethyl group, or preferably hydrogen. $R_1$ and $R_2$ are C(1-4) alkyl groups such as methyl, ethyl, n-propyl and isopropyl, as well as n-, iso-, sec-, and t-butyl. It is crucial for the alkyl groups that $R_1$ and $R_2$ differ in the number of carbon atoms and further for the total number of carbon atoms of the two groups to range from 5 to 7, preferably 6. Particularly suitable ethylene glycol ethers are the compounds in which $R_1$=methyl or ethyl and $R_2$=t-butyl.

The glycol ether cocatalysts of the invention are known compounds per se. They can be synthesized, for example, by the Williamson reaction in which a sodium alkoxide and an alkyl halide are reacted. The ethers of the formula:

$$R_1-O-CH_2-CH-O-C(CH_3)_3$$
$$|$$
$$R_3$$

can be made in a simple way by reacting the appropriate ether alcohol:

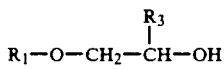

with isobutene in the presence of an acidic ion exchanger.

The cocatalyst is used in a ratio of 2:1 to 30:1, especially 2:1 to 15:1 based on the number of moles of catalyst. Larger amounts of cocatalyst are generally needed at higher temperatures to achieve the desired microstructure control.

In order to improve the randomizing effect, a surface-active compound containing the $-SO_3M$ or $-OSO_3M$ group wherein M is Na, K, Rb, or Cs, is added to the reaction medium. The surface-active compound is an alkylarylsulfonate, a sulfonate containing an amide or ester group or a sulfuric acid half-ester with higher alcohols. The surface-active compound is added in amounts of up to 1 mole per mole of lithium in the initiator.

A particularly preferred variation of the process pursuant to the invention consists of coupling the polymerization units obtained after largely complete reaction of the monomers with a coupler to form star-shaped polymers. Another possibility is the reaction of the units obtained with reactive electrophiles such as ketones, epoxides, esters, and isocyanates. In both cases, a functionalized polymer is obtained.

Couplers particularly suitable for this purpose are tetrahalides of the elements silicon, germanium, tin, and lead, as well as aromatics that have at least two vinyl groups such as 1,3,5-trivinylbenzene and 1,3- and 1,4-divinylbenzene.

The polymerization is carried out in the temperature range from 0 to 130° C., preferably 40 to 100° C. The coupling reaction is carried out at 0 to 150° C., preferably 40 to 100° C. The coupled polymers obtained have a molecular weight of 40,000 to 1,500,000, preferably 200,000 to 1,000,000. The process can be carried out either discontinuously or continuously.

The amorphous polymers obtained, if they are to be processed into vulcanizates, are mixed with active, reinforcing fillers, a vulcanizing agent, and conventional additives. It is generally necessary to carry out this mixing of ingredients while subjecting the same to the action of shear forces.

Compositions that are intended for the production of tire treads are generally shaped into tread strips. The conditions of temperature and time during homogenizing and molding, which can be done in an extruder, for example, are chosen so that no vulcanization occurs.

The rubber component in this case consists, for example, of 10 to 40 wt. % of a reaction product of the present invention and 90 to 60 wt. % of a conventional, amorphous, highly unsaturated general-purpose rubber such as styrene-butadiene rubber, 1,4-cis-polybutadiene, 1,4-cis-polyisoprene, or natural rubber.

Examples of active reinforcing fillers which are blended in to the rubber composition are tire tread carbon blacks of various activities, especially those selected from the N-300 series (ASTM), highly dispersed silica, treated with silane adhesion promotors and mixtures of these ingredients. Conventional vulcanizing agents containing sulfur and accelerators can be employed. The quantity of vulcanizing agent is governed by the other components in the vulcanizable composition and can be determined by simple preliminary experiments.

Conventional additives comprise plasticizing oils customarily used in rubber technology, preferably aromatic aliphatic and napthenic hydrocarbon oils, zinc oxide, stearic acid as well as conventional auxiliaries such as resin acid, antioxidants, and ozone-protective waxes in the usual amounts.

The polymers of the present invention are particularly suitable for the production of treads for passenger car and truck tires, both for producing new tires and for retreading used tires. The tire treads obtained are distinguished by excellent road adhesion (wet grip properties). Further features of the tire treads are high reversion stability during the vulcanization process and the extraordinarily high network stability of the tire tread under dynamic stress. Further, the polymers of the present invention can also be used for producing antivibration elements (for example, see German Patent Application Disclosure 24 59 357).

Having generally described this invention, a further understanding can be obtained by reference to certain specific examples which are provided herein for purposes of illustration only and are not intended to be limiting unless otherwise specified.

Experimental Section

The following are details relating to the experiments which follow:

The hydrocarbon solvent employed consisted of 50% n-hexane which is called a $C_6$ cut. Other components of this hydrocarbon mixture are pentane, heptane, and octane and their isomers. The solvent was dried over a molecular sieve having a pore size of 0.4 nm, so that the water content was reduced to below 10 ppm, and was then stripped with $N_2$.

The organolithium compound employed was n-butyllithium (LiBu) which was used in the form of a 15 wt. % solution in hexane.

Isoprene was separated from its stabilizer by distillation before use.

The glycol ethers were dried over aluminum oxide and then titrated to the endpoint with n-butyllithium in the presence of o-phenanthroline.

Divinylbenzene (DVB) was used in the form of a solution dried over $Al_2O_3$ and contained 44% m- and 20% p-divinylbenzene.

After reaction with a coupling agent the percentage of rubber that had a star-shaped structure which is distinguished from the uncoupled rubber by a substantially higher molecular weight, is considered to be the coupling yield. This determination was made by GPC analysis, using tetrahydrofuran as solvent and polystyrene as column material. The polymers are characterized by a light-scattering detector. Samples were taken from the reactor before adding the coupler and at the end of the reaction for this purpose.

The microstructure of the polymer product was determined from its IR spectrum.

The glass transition temperature Tg was measured by torsional oscillation (1 Hz with 1° C./min rate of heating).

EXAMPLE 1

400 parts of hexane, a monomer mixture consisting of 40 parts of 1,3-butadiene, 40 parts of isoprene, 20 parts of styrene, and 0.02 parts of DVB, and 1.0 part of ethylene glycol ethyl tertiary-butyl ether were placed in a V2A stainless steel autoclave flushed with dry nitrogen. The mixture was titrated with butyllithium under thermoelectric control after drying over a molecular sieve (0.4 nm). The polymerization was initiated at 40° C. by adding 0.05 parts of n-butyllithium. The temperature with slight cooling reached 108° C. after 8 minutes. The mixture was allowed to continue reacting at this temperature for 30 minutes. After cooling to 50° C., the polymerization was terminated by adding a solution of 0.5 parts of 2,2′-methylene-bis (4-methyl-6-tertiary-butylphenol) in 2 parts of wet toluene. The solvent was removed by distillation with steam and the polymer was dried in a circulating-air drying oven for 24 hours at 70° C.

EXAMPLES 2 to 5

The method conforms to Example 1 (see Table 1).

EXAMPLE 6

550 parts of hexane, a monomer mixture consisting of 75 parts of 1,3-butadiene and 25 parts of styrene, and 0.7 parts of ethylene glycol ethyl tertiary-butyl ether were placed in a V2A stainless steel autoclave flushed with dry nitrogen. The mixture was titrated with butyllithium under thermoelectric control after drying over a molecular sieve (0.4 nm). The polymerization was initiated at 35° C. by adding 0.080 parts of n-BuLi. The temperature with slight cooling reached 113° C. after 10 minutes. The batch was allowed to continue reacting at this temperature for 30 minutes. 0.81 parts of divinylbenzene was then added at this temperature. After 20 minutes and after cooling to 50° C., the polymerization was terminated by adding a solution of 0.5 parts of 2,2′-methylenebis(4-methyl-6-tertiary-butylphenol) in two parts of wet toluene. The solvent was removed by distillation with steam and the polymer was dried in a circulating-air drying oven for 24 hours at 70° C.

EXAMPLES 7 to 9

The method conforms to Example 6 (see Table 2).

TABLE 1

|  | Examples |  |  |  |  |
|---|---|---|---|---|---|
|  | 1 | 2 | 3 | 4 | 5 |
| Batch: |  |  |  |  |  |
| Hexane (parts) | 400 | 400 | 460 | 300 | 560 |
| Butadiene | 40 | 77 | — | 30 | 40 |
| Isoprene | 40 | — | 75 | 70 | 40 |
| Styrene | 20 | 23 | 25 | — | 20 |
| BEE[1] | 1.0 | — | 0.4 | 1.0 | 0.75 |
| BPE[2] | — | 0.45 | — | — | — |
| DVB | 0.02 | 0.015 | 0.02 | 0.02 | 0.02 |
| Initiator: |  |  |  |  |  |
| LiBu | 0.050 | 0.048 | 0.055 | 0.047 | 0.042 |
| Init. Temp. (°C.) | 40 | 27 | 50 | 39 | 40 |
| Final Temp. (°C.) | 108 | 122 | 54 | 78 | 60 |
| React. Time (Min.) | 38 | 50 | 150 | 65 | 60 |
| Microstructure (%): |  |  |  |  |  |
| trans-1,4-Butadiene | 10 | 15 | — | 5 | 6 |
| 1,2-Butadiene | 22 | 52 | — | 33 | 30 |
| cis-1,4-Butadiene | 8 | 9 | — | 4 | 7 |
| 3,4-Isoprene | 28 | — | 44 | 49 | 33 |
| 1,4-Isoprene | 8 | — | 21 | 9 | 2 |
| 1,2-Isoprene | (*) | — | 8 | (*) | (*) |
| Styrene | 24 | 24 | 27 | — | 22 |
| Block PS (%)[3] | 0.5 | 2.5 | 0.9 | — | 0.5 |
| Tg (°C.) | −17 | −24 | −12 | −11 | ±0 |
| $M_L$ (1 + 4) (100° C.)[5] | 53 | 53 | 45 | 54 | 52 |
| DH[4] | 625 | 750 | 525 | 675 | 575 |
| DE[4] | 26 | 22 | 20 | 23 | 21 |

(*) Included in the 1,2-Butadiene figure
[1] Ethylene glycol ethyl t-butyl ether
[2] Ethylene glycol propyl t-butyl ether
[3] Determination of block polystyrene fraction from Houben-Weyl, Methoden der org. Chemie Vol. 14/I (1961), page 698
[4] Defo hardness and elasticity from DIN 53 514
[5] Mooney viscosity according to DIN 53 523
[6] Ethylene glycol methyl t-butyl ether

TABLE 2

|  | Examples |  |  |  |
|---|---|---|---|---|
|  | 6 | 7 | 8 | 9 |
| Batch: |  |  |  |  |
| Hexane (parts) | 550 | 550 | 550 | 550 |
| Butadiene | 75 | 75 | 40 | 75 |
| Isoprene | — | — | 40 | — |
| Styrene | 25 | 25 | 20 | 25 |
| BEE[1] | 0.7 | 0.7 | 0.8 | — |
| MEB[6] | — | — | — | 0.8 |
| Initiator: |  |  |  |  |
| LiBu | 0.080 | 0.067 | 0.074 | 0.082 |
| Init. Temp. (°C.) | 35 | 30 | 35 | 35 |
| Final Tem. (°C.) | 113 | 115 | 60 | 110 |
| React. Time (Min.) | 30 | 55 | 80 | 35 |
| Addition of DVB (Parts) | 0.81 | — | 0.75 | 0.81 |
| SiCl4 | — | 0.045 | — | — |
| Reaction time (Min.) | 20 | 20 | 20 | 20 |
| Microstructure (%): |  |  |  |  |
| trans-1,4-Butadiene | 12 | 13 | 5 | 8 |
| 1,2-Butadiene | 54 | 56 | 32 | 58 |
| cis-1,4-Butadiene | 8 | 7 | 7 | 8 |
| 3,4-Isoprene | — | — | 33 | — |
| 1,4-Isoprene | — | — | 2 | — |
| 1,2-Isoprene | — | — | (*) | — |
| Styrene | 26 | 25 | 21 | 26 |
| Block PS (%)[3] | 2.8 | 2.5 | 0.5 | 2.0 |
| Tg (°C.) | −22 | −20 | ±1 | −20 |
| $M_L$ (1 + 4) (100° C.)[5] | 48 | 47 | 50 | 50 |
| Multiplicity | 6.1 | 3.7 | 4.8 | 5.5 |
| Coupling yield (%) | 80 | 75 | 80 | 75 |

Refer to the explanations for Table 1 with regard to the comments.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A process for preparing block-free conjugated diene polymers, comprising:

anionically polymerizing monomers consisting essentially of at least two compounds selected from the group consisting of 1,3-butadiene, isoprene and styrene in an inert organic solvent in the presence of an organolithium compound as a catalyst and a cocatalyst of a glycol dialkyl ether:

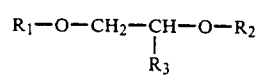

wherein $R_3$ is hydrogen, methyl or ethyl, $R_1$ and $R_2$ are alkyl groups of different numbers of carbon atoms selected from the group consisting of methyl, ethyl, n-propyl, isopropyl, n-butyl, isobutyl, sec-butyl and t-butyl, and the total number of carbon atoms in the alkyl groups $R_1$ and $R_2$ ranges from 5 to 7.

2. The process of claim 1, wherein the total number of carbon atoms in the two alkyl groups $R_1$ and $R_2$ is 6.

3. The process of claim 1 or 2, wherein $R_3$ is hydrogen.

4. The process of claim 1 or 2, wherein $R_1$ is methyl.

5. The process of claim 1, wherein $R_2$ is an n-, i-, or t-butyl group.

6. The process of claim 1, wherein the reacting monomer mixture consists essentially of:
   (a) a mixture of isoprene and up to 75 wt. % 1,3-butadiene, or
   (b) a mixture of 15 to 75 wt. % 1,3-butadiene, 20 to 85 wt. % isoprene, and up to 35 wt. % styrene.

7. The process of claim 1, wherein said block-free polymer is coupled by reacting the polymer product with a coupler.

8. The process of claim 7, wherein said coupler is di- or trivinylbenzene.

9. A block-free polymer prepared by the process of claim 1.

10. The process of claim 1, wherein the amount of said cocatalyst employed ranges from 2:1 to 30:1 based on the number of moles of said catalyst.

11. The process of claim 1, wherein said anionic polymerization is conducted at a temperature ranging from 0 to 130° C.

12. The process of claim 7, wherein the polymer is coupled at a temperature ranging from 0 to 150° C.

13. The process of claim 7, wherein the coupled polymer product has a molecular weight ranging from 40,000 to 1,500,000.

14. The process of claim 3, wherein $R_1$ is methyl.

* * * * *